Feb. 6, 1940. R. H. GOULD 2,189,107
INDICATING APPARATUS
Filed Dec. 2, 1938 2 Sheets-Sheet 1

Inventor:
Robert Howe Gould,
By Potter, Pierce & Scheffler,
Attorneys.

Feb. 6, 1940.  R. H. GOULD  2,189,107
INDICATING APPARATUS
Filed Dec. 2, 1938    2 Sheets-Sheet 2
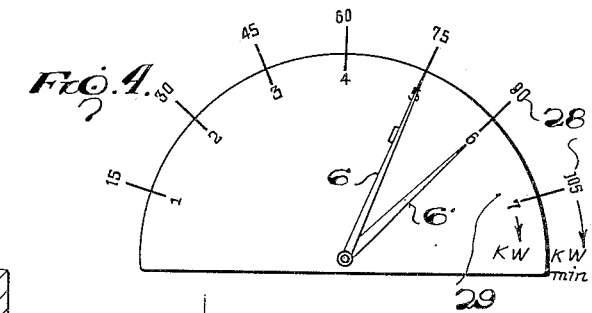
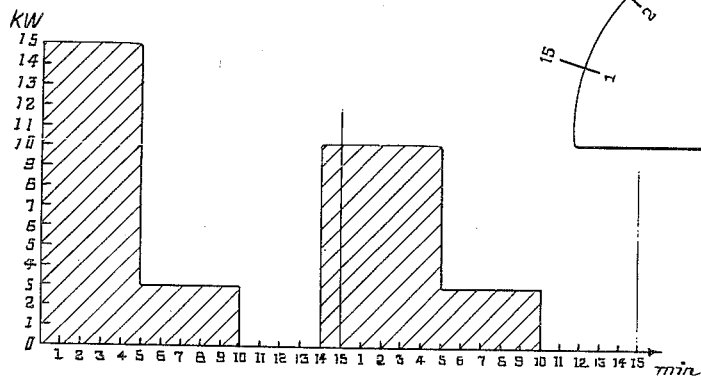
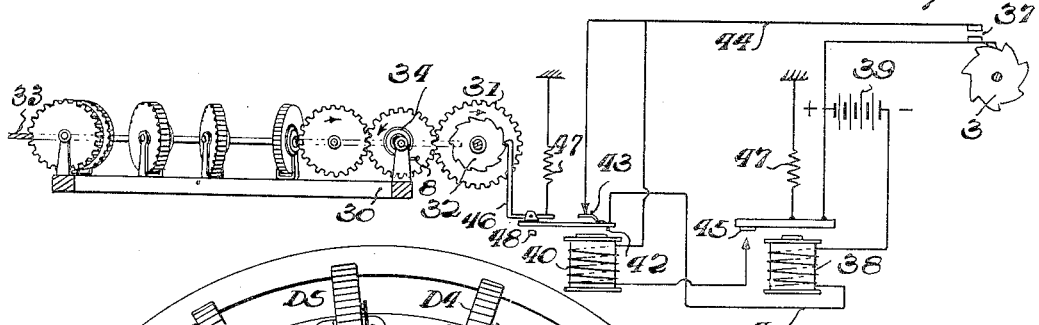
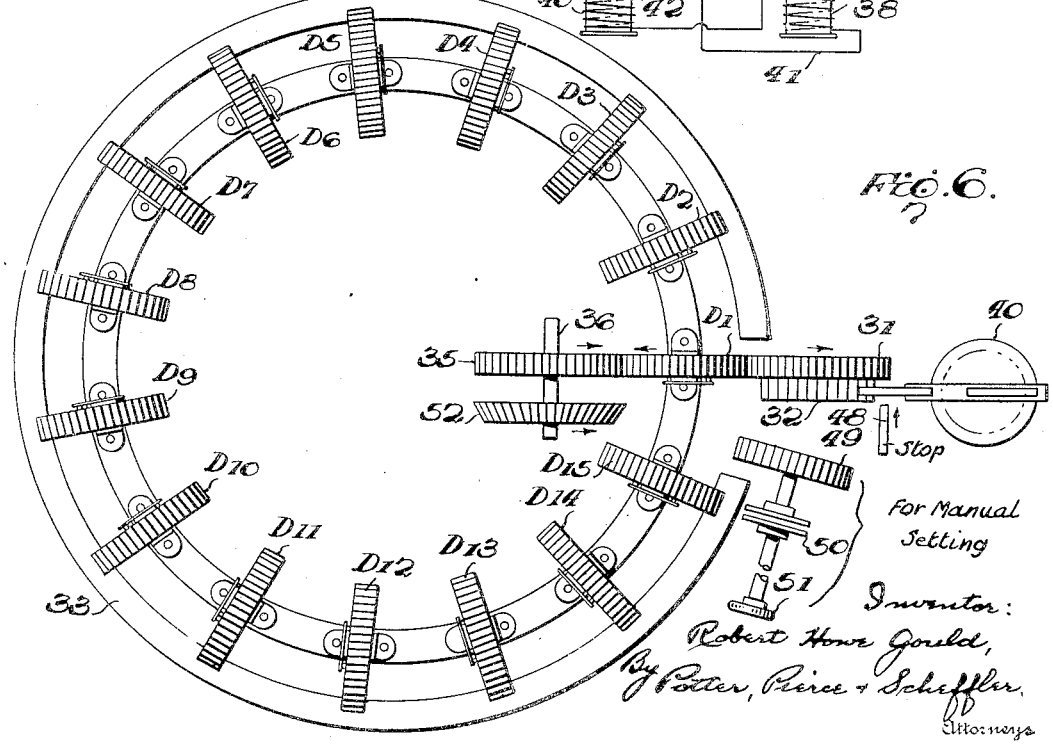

Patented Feb. 6, 1940

2,189,107

UNITED STATES PATENT OFFICE 2,189,107

INDICATING APPARATUS

Robert Howe Gould, Johannesburg, Transvaal, Union of South Africa

Application December 2, 1938, Serial No. 243,653
In Germany November 27, 1937

11 Claims. (Cl. 171—34)

This invention relates to indicating apparatus for use with energy-responsive instruments, especially instruments for measuring the consumption of electrical energy. The indicating apparatus also affords an indication of the average load, or the maximum, and is in this respect similar to the so-called maximum indicators.

One type of maximum indicating instrument is subject to error when the duration of the maximum load does not coincide with the length of the registration periods which may be, for example, a quarter-hour. Furthermore, the maximum at any instant cannot be determined in less than one registration period.

The present invention contemplates an indicating device which operates as an average or integrating meter, and particularly an apparatus for indicating the average load over definite periods and the energy consumption during such periods. An object is to provide an indicating apparatus of maximum indicator type in which the pointer does not start from zero at the beginning of each registration period but continuously indicates the actual average load, the maximum load during preceding registration periods, and the energy consumption for the prior registration period. An object is to provide indicating apparatus actuated by impulses each corresponding to a unit energy consumption, a plurality of devices in which the impulses are accumulated in successive intervals into which the registration periods are divided, a pointer actuated in succession by each device during the interval in which the device is accumulating impulses, and mechanism for resetting each device to an initial zero position just prior to the next accumulation of impulses in that device, whereby the pointer displacement introduced during each interval of one registration period is removed at the start of the corresponding interval of the next registration period.

These and other objects and advantages of the invention will be apparent from the following specification when taken with the accompanying drawings in which:

Fig. 3 is a chart of an assumed load over two registration periods;

Fig. 4 is a diagrammatic view of the instrument scale and pointers; and

Figs. 5 and 6 are a diagrammatic and a fragmentary plan view of another embodiment.

Figure 1:
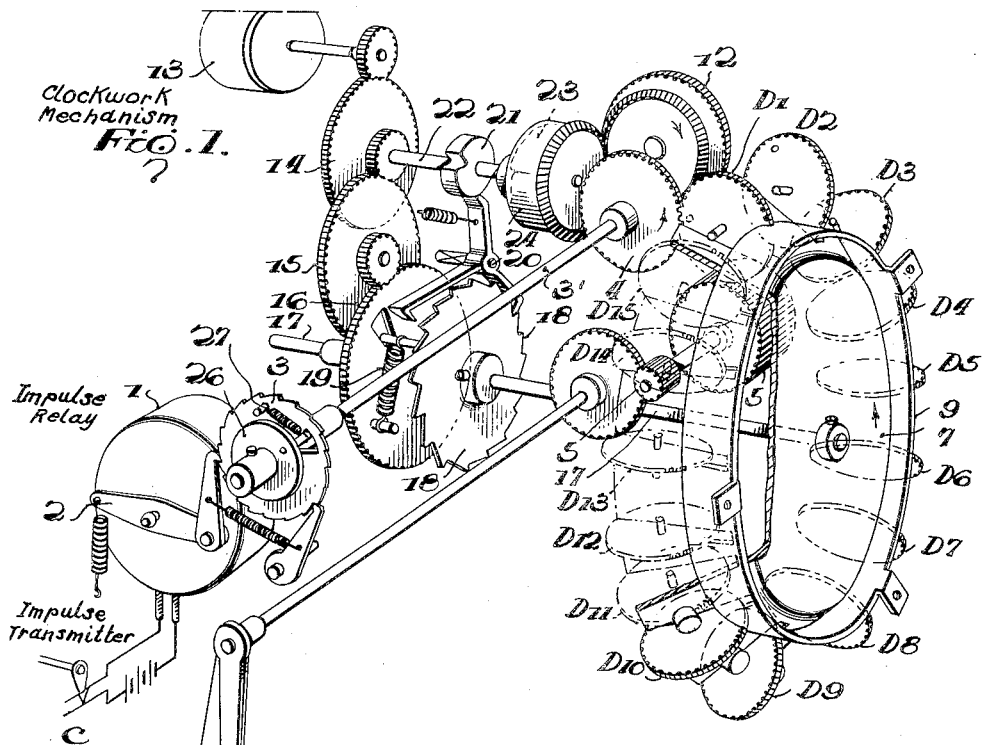
Fig. 1 is a fragmentary perspective view of one embodiment of the invention.

The invention can be best understood by first considering the general method of operation of the apparatus. It is assumed that a kilowatt-hour meter sends out a current pulse for each consumption of ¼ kilowatt hour, and that these pulses are to be registered or accumulated for a registration period of ¼ hour. If therefore during a period of 15 minutes, N current pulses have been given to the indicating pointer by the meter, the pointer will indicate an average load of N kw. during the registration period. The pulses are transmitted to the pointer according to the invention through transmission gears, the rotary displacements corresponding to the delivered current pulses being stored up by displacement of the pointer. For instance, if fifteen such gears are provided for connection with the impulse-actuated member for intervals of about one minute, the impulses sent out during a period of fifteen minutes are successively effective on these gears. If the first gear receives $a$ impulses, the second $b$ impulses and the next $c$ impulses, it is found that a total of $$N = a + b + c + \ldots + n + o \quad (1)$$

impulses are the result, and the pointer actuated by the gears indicates N kw. at the end of the 15 minute period.

Each accumulating gear is turned back by the amount of rotary displacement previously imparted to it, and correspondingly returns the indicating pointer by that amount, just prior to the next accumulation of impulses in the several gears. At the beginning the 16th, 17th and each succeeding minute after their first displacement, the indicating mechanism is set back by the increments $a$, $b$, $c$, etc., and the accumulated impulses at the start of the 16th minute is therefore $$N' = N - a \quad (2)$$

During the 16th minute, the value is increased to $$N' = N - a + a' \quad (3)$$

where $a'$ is the number of impulses received from the meter during that interval. In case $a'$ is greater than $a$, the indicating pointer and a trailing pointer driven by the indicating mechanism assume a new position corresponding to Equation 3, otherwise the indicating pointer only is adjusted. At the end of the 16th minute, the indicating mechanism adjusts itself to the value $$N' = N - a + a' - b \quad (4)$$

At the end of the 17th minute, its position corresponds to the value $$N' = N - a + a' - b + b' \quad (5)$$

where $b'$ is the number of impulses received during the second interval of the registration period. In like manner, each accumulator gear is returned to its initial position at the beginning of the interval during which it is to receive impulses, and the pointer is thus moved back by the amount of its advance during the corresponding interval of the previous registration period.

In the drawings, the reference numeral 1 identifies a relay that is actuated by current pulses from successive closures of the switch contact C on the counter or meter (not shown), each circuit closure corresponding to a predetermined fixed increment of the consumed energy, for example to ¼ kilowatt-hours or 15 kilowatt-minutes. The relay armature 2 moves a ratchet wheel 3 on shaft 3' by one notch through a usual pawl mechanism, and this motion is transmitted by the driver gear 4 to one of the accumulator gears D1 to D15, and thereby to the gearing 5 which actuates the indicating pointer 6, and thereby the maximum pointer 6'.

The accumulator gears are pivotally mounted on and extend radially of the flaring rim of a dished plate 7, and each gear has a stop pin 8 for engagement with the plate to determine the zero position of the gear. The plate 7 is rotated by mechanism to be described, and each gear moves into locked engagement with the rim of a stationary locking ring 9 as that gear is moved out of mesh with the driver gear 4. The ring 9 has a notch 10 which releases the accumulator gears as they move into mesh with the driver gear 4, and a second notch 11 which releases the gears as they move successively into mesh with a resetting gear 12.

The notches 10, 11 are spaced by one-half the pitch of the accumulator gears, and the advance of the gear plate 7 to bring successive gears in mesh with the driver gear 4 is made in two steps. This mechanism for advancing the plate 7 includes a mechanical or electrical clockwork mechanism 13, a gear train 14, 15 which drives gear 16 that is loose on the shaft 17 which carries the gear plate 7. The ratchet wheel 18 is secured to shaft 17 and has the same number of teeth as there are accumulator gears. The wheel 18 is connected to the free wheel 16 by a spring 19 and is engaged by a double-claw pawl 20 that is controlled by a cam 21 on the shaft 22 that is rotated at the rate of one turn per minute by the clock mechanism. Cam 21 has a notch into which the end of pawl 20 moves to lift the latching claw and depress the lead-off claw to arrest the ratchet wheel 18 after it has advanced one-half the toothed pitch. Further rotation of cam 21 depresses the end of pawl 20 and latches the ratchet wheel after another advance of one-half tooth. The first step of the ratchet wheel turns shaft 17 and gear plate 7 by one-half the gear interval to bring an accumulator gear in line with the notch 11 of the locking ring 9, and in mesh with the resetting gear 12 and the elongated gear 5 of the pointer mechanism. The second step of the ratchet wheel 18 turns the plate 7 to move the gear from notch 11 to notch 10 of the ring 9, and thus into mesh with the driver gear.

The cam 21 is shaped to provide a dwell of about one second between these steps, and each accumulator gear is therefore meshed with the resetting gear 12 for about one second and meshed with the driver gear 4 for about 59 seconds of the one minute interval.

The resetting gear 12 is maintained under tension by a coil spring 23 in the housing 24 which is coupled by bevel gears 25 to the gear 12, the spring 23 being wound by shaft 22 through the usual friction drive. The stress thus continuously imposed on the gear 12 therefore rotates the accumulator gears, as they move in succession into line with the releasing notch 11, to restore the gears to zero position with their stop pins 8 in engagement with the gear plate 7. The edge of the gear plate 7 moves into a toothed space of gear 12 to prevent the unwinding of the spring 22 when the accumulator gears move from the resetting gear to the driving gear.

The rim of the gear plate 7 also interlocks with the driver gear 4 when an accumulator gear is in mesh with the resetting gear. Current pulses imparted to the relay 1 while the gear 4 is locked are stored in the ratchet wheel 3 which has a pin-and-slot connection to a collar 26 on the shaft 3', and a spring 27 for yieldingly holding the wheel 3 and collar 26 in predetermined relation. An advance of the wheel 3 when the gear 4 and shaft 3' are locked tensions the spring 27, and the shaft 3' is thereby rotated as soon as the gear 4 is freed by its engagement with the next accumulator gear. The correct number of current pulses is therefore imparted to the accumulator gears and the resultant position of the pointer 6 indicates the total number of current pulses that occurred within the preceding fourteen to fifteen minutes, the summation for fourteen minutes being indicated at the beginning of one interval and for fifteen minutes being indicated at the close of that interval.

The number of current pulses is proportional to the consumption in kilowatt hours and this value divided by the registration period, i. e., fifteen minutes, gives the average load in kilowatts for the registration period. For instance, in case of a load as shown in Fig. 3, the following impulses and adjustments of the accumulator gears D1 to D15 occur in the first quarter of an hour:

| Power consumption | Load, kilowatts | Duration, minutes | Accumulator gear | No. of impulses | Pointer adjustments |
|---|---|---|---|---|---|
| 75 kw. min | 15 | 5 | D1 | 1 | 1 |
|  |  |  | D2 | 1 | 2 |
|  |  |  | D3 | 1 | 3 |
|  |  |  | D4 | 1 | 4 |
|  |  |  | D5 | 1 | 5 |
| 15 kw. min | 3 | 5 | D6 | 0 | -------- |
|  |  |  | D7 | 0 | -------- |
|  |  |  | D8 | 0 | -------- |
|  |  |  | D9 | 0 | -------- |
|  |  |  | D10 | 1 | 6 |
| 10 kw. min | 10 | 1 | D11 | 0 | -------- |
|  |  |  | D12 | 0 | -------- |
|  |  |  | D13 | 0 | -------- |
|  |  |  | D14 | 0 | -------- |
|  |  |  | D15 | 0 | -------- |
| Advance of the indicating pointer |  |  |  |  | 6 steps |

For the second quarter of an hour, the following tabulation corresponds to the second section of the Fig. 3 chart, and to the resulting current pulses and registrations

| Power consumption | Load, kilowatts | Duration, minutes | Accumulator gear | No. of impulses | Pointer adjustments |
|---|---|---|---|---|---|
| 60 kw. min | 10 | 5 | D1 | 1 | −1+1=0 |
|  |  |  | D2 | 1 | −1+1=0 |
|  |  |  | D3 | 0 | −1 |
|  |  |  | D4 | 1 | −1+1=0 |
|  |  |  | D5 | 1 | −1+1=0 |
| 15 kw. min | 3 | 5 | D6 | 0 | 0 |
|  |  |  | D7 | 0 | 0 |
|  |  |  | D8 | 0 | 0 |
|  |  |  | D9 | 0 | 0 |
|  |  |  | D10 | 1 | −1+1=0 |
| Advance of the indicating pointer |  |  |  |  | 6 steps backwards. 5 steps forwards. |

The scale of the indicating apparatus may be provided, as shown in Fig. 4, with graduations 28 of energy in terms of kilowatt-minutes and graduations of load in kilowatts. The above tabulations show that the pointers 6 and 6' will be advanced six steps during the first registration period, and that the pointer 6 drops back to the fifth step during the second period. The pointers therefore stand in the positions shown in Fig. 4.

The position of pointer 6 is a measure of the actual average load and energy consumption during the previous fourteen or fifteen minutes, and the position of pointer 6' shows the maximum load and the maximum energy consumption for any previous registering period. The accuracy of the indications will of course be increased by decreasing the unit energy consumption value that produces a current pulse.

Figure 2A:
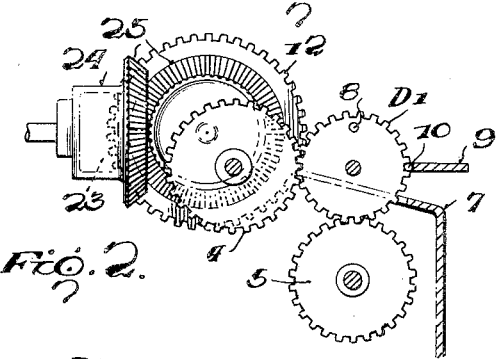
Fig. 2a is a fragmentary sectional view showing an accumulator gear in mesh with the driving gear.
Figure 2:
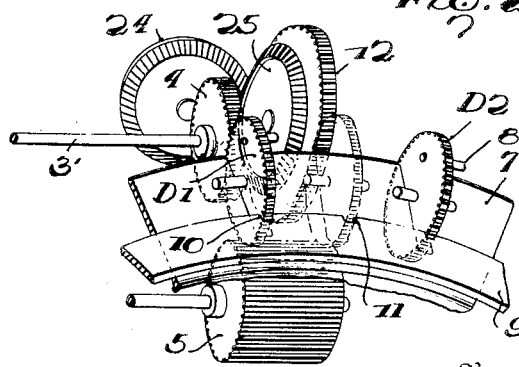
Fig. 2 is an enlarged detail view of the gears for actuating and for resetting the accumulator gears, and parts associated therewith.

The electrically actuated accumulator gear assembly of Figs. 5 and 6 may be employed in place of the mechanically actuated gears 1, Figs. 1 and 2. The mechanism for advancing the gear assembly is not shown but may be substantially as previously described.

The several gears D1 to D15 are mounted on a rotatable ring 30 for successive engagement with the driver gear 31 which has a ratchet 32 fixed thereto. A plate 33 surrounds the gear assembly and locks the gears against rotation except for a short space adjacent the driver gear. Each accumulator has a spiral spring 34 which rotates the gear to bring stop pin 8 against the gear support when the gear clears the locking plate 33 and meshes with the bevel gear 52 on the pointer staff 36. The spur gear 25 on the pointer staff 36 is alined with the driver gear 31, and the accumulator gears mesh, in succession, with gears 31 and 35.

The electrical circuit includes an impulse switch 37 that is driven by the meter or counter, a primary relay 38, a current source 39 and secondary relay 40. Relay 38 is connected to one terminal of the battery 39 and, through lead 41 to the armature 42 of relay 40, then through a normally closed switch 43, lead 44 and switch 37 to the other side of the battery. Relay 40 is connected to the lead 44 and through the normally open switch 45 of the relay 38, to the second terminal of the battery. The armature 42 of the auxiliary relay carries a pawl 46 for advancing the ratchet 32 of the driver gear 31, and springs 47 normally retain the armatures in raised position. A stop 48 is connected to the mechanism for turning the accumulator gear ring 30, and the stop is moved into position beneath the armature 42 during the advance motion of the gear ring.

Closure of switch 37 energizes the relay 38 as the switch 43 is normally closed, and the switch 45 is thereby closed. This closure energizes the relay 40 and, under normal conditions, the armature 42 drops to advance the rachet 32 one step, and to open the circuit of relay 38 at switch 43. If the stop 48 prevents movement of the armature 42 of relay 40, the switch 43 remains closed and the switch 45 completes a holding circuit in which both relays are connected in series with the battery 39. At the completion of the movement of the accumulator gear ring to mesh a gear with the driver gear 31, the stop 48 is withdrawn and the armature 42 drops to depress the pawl 46 and to open the holding circuit.

Manually operated means may be provided for setting the indicating pointer at any desired position. As shown in Fig. 6, this mechanism includes a gear 49 that may be driven through a clutch 50 by a knob 51. The gear 49 is positioned to mesh with the accumulator gear in the half-step position of the gear ring 30 which meshes an accumulator gear with the resetting gear 35 on the pointer staff.

It is to be understood that the invention is not restricted to the particular apparatus herein described and that various modifications thereof fall within the spirit of my invention as set forth in the following claims.

I claim:

1. Indicating apparatus for use with an energy consumption meter, said apparatus comprising a driver member adapted to be rotated at a speed proportional to the energy consumption measured by the meter, an indicating mechanism including a pointer and a gear member positively connected to the same, and accumulator means for transmitting motion from said driver member to said gear member; said accumulator means including a plurality of coupling gears, a support for said coupling gears, means for moving said support to move each coupling gear in succession into a coupling position of engagement with both of said members for one interval of a multiple-interval registration period, and means to impart to the indicating mechanism pointer just prior to movement of each coupling gear into said coupling position a displacement equal in magnitude and opposite in sense to the displacement transmitted to the pointer through that coupling gear when the latter was in said coupling position during its previous registration interval.

2. Indicating apparatus for use with a metering device that emits a current pulse for each increase of the measured magnitude by a predetermined value, said apparatus comprising a driver gear and means responsive to current pulses to turn said gear, indicating mechanism including a gear, and accumulator means for transmitting motion from the driver gear to the driven gear; said accumulator means comprising a plurality of accumulator gears, a rotary support carrying said accumulator gears and movable to bring each accumulator gear in succession into and out of a position of meshing engagement with both said driver and said driven gear, and time-controlled means for rotating said support step-by-step to bring the individual accumulator gears successively into said engagement position at uniformly repeated intervals of fixed duration.

3. Indicating apparatus as claimed in claim 2, wherein each accumulator gear has a stop for determining an initial zero position thereof, in combination with means for locking each accumulator gear against rotation during travel of that accumulator gear from said engagement position to an approach point adjacent said engagement position, and means for resetting each accumulator gear to zero position upon reaching said approach point.

4. Indicating apparatus of the type stated comprising a driver gear, means for intermittently driving said gear by uniform increments, indicating mechanism including a driven gear, and accumulator means for coupling said gears; said accumulator means comprising a rotatable support, a plurality of accumulator gears on said support, stop means determining an initial zero position for each accumulator gear, time-controlled means for rotating said support to bring each accumulator gear in succession into two closely adjacent operative positions in uniformly repeated cycles of fixed dwell intervals, each accumulator gear meshing with said driven gear in its first operative position and meshing with both said driver and said driven gears in its second operative position, means locking said accumulator gears against rotation during movement from said second position back to said first position, and means for resetting each accumulator gear to zero position upon reaching the first operating position.

5. Indicating apparatus as claimed in claim 4, wherein said locking means comprises a stationary ring having an edge portion engaging in the teeth of the accumulator gears.

6. Indicating apparatus as claimed in claim 4, wherein said resetting means comprises a resetting gear positioned to mesh with the accumulator gears when in the first operative position, a spring tensioned to actuate said resetting gear, and means for maintaining said spring under tension.

7. Indicating apparatus as claimed in claim 4, wherein said resetting means comprises a resetting spring for each accumulator gear.

8. Indicating apparatus comprising a driver gear, intermittently actuated impulse means for turning said driver gear through one tooth space, indicating mechanism including a driven gear, accumulator means including a plurality of accumulator gears and means supporting the same for movement in succession into an active position of meshing engagement with both said driver gear and said driven gear, means locking said driver gear against motion during the movement of successive accumulator gears into said active position, and means for storing an impulse in said impulse means for subsequent turning of said driver gear in the event said impulse means is actuated while said driver gear is locked.

9. Indicating apparatus as claimed in claim 8, wherein said storing means is a tensioned lost-motion coupling.

10. Indicating apparatus as claimed in claim 8, wherein said storing means comprises electrical means.

11. Indicating means for use with a kilowatt hour meter that emits a current pulse for each successive consumption of a predetermined unit of consumed energy, said apparatus comprising a driver gear, means responsive to the emitted current pulses to actuate said gear, indicating mechanism including an indicating pointer and a maximum pointer movable over a scale graduated in load and in energy values, a driven gear for displacing said indicating pointer, a plurality of accumulator gears, time-controlled means for moving said accumulator gears in succession into an active position in mesh with both said driver gear and said driven gear for cyclically repeated intervals of fixed duration, and means moving each accumulator gear and the driven gear backward by the amount of its advance during the last active interval immediately prior to the arrival of that accumulator gear at said active position, whereby the indicating pointer continuously indicates average consumption during the preceding cycle and the maximum pointer indicates the maximum consumption during any preceding cycle.

ROBERT HOWE GOULD.